United States Patent
Becker et al.

(10) Patent No.: US 9,894,687 B2
(45) Date of Patent: Feb. 13, 2018

(54) METHODS AND APPARATUSES FOR PROVIDING RANDOM ACCESS COMMUNICATION

(71) Applicant: Hughes Network Systems, LLC, Germantown, MD (US)

(72) Inventors: Neal David Becker, Frederick, MD (US); Mustafa Eroz, Rockville, MD (US); Lin-Nan Lee, Potomac, MD (US); Stanley E. Kay, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 153 days.

(21) Appl. No.: 14/947,343

(22) Filed: Nov. 20, 2015

(65) Prior Publication Data
US 2017/0150528 A1    May 25, 2017

(51) Int. Cl.
*H04W 74/08* (2009.01)
*H04L 29/06* (2006.01)
*H04W 28/06* (2009.01)
*H04W 72/08* (2009.01)
*H04L 1/00* (2006.01)

(52) U.S. Cl.
CPC .......... *H04W 74/0833* (2013.01); *H04L 1/00* (2013.01); *H04L 69/22* (2013.01); *H04W 28/065* (2013.01); *H04W 72/082* (2013.01); *H04W 74/08* (2013.01)

(58) Field of Classification Search
CPC .......... H04W 74/0833; H04W 28/065; H04W 72/082; H04L 69/22
See application file for complete search history.

(56) References Cited

U.S. PATENT DOCUMENTS

| | | | |
|---|---|---|---|
| 5,459,469 A | 10/1995 | Schuchman et al. | |
| 2004/0147257 A1* | 7/2004 | Phillips | H04B 7/18532 455/427 |
| 2007/0040704 A1 | 2/2007 | Smee et al. | |

(Continued)

OTHER PUBLICATIONS

PCT Application No. PCT/US2016/062959, Invitation to Pay Additional Fees and, Where Applicable Protest Fee, Jan. 17, 2017.
(Continued)

*Primary Examiner* — Min Jung
(74) *Attorney, Agent, or Firm* — Edell, Shapiro & Finnan LLC; Richard C. Irving

(57) ABSTRACT

Methods and devices are provided. Devices asynchronously transmit, without diversity, bursts including information encoded using a low rate FEC code having a code rate no higher than ½. A terminal receives transmitted multiple overlapping bursts. The terminal detects and decodes bursts in a window of burst times, performs an iteration of an iterative interference cancellation process, and when at least one burst of at least a portion of the window remains incorrectly decoded, another iteration of the iterative cancellation process is performed as long as a maximum number of repeated iterations has not yet been performed. When all of the bursts in at least the portion of the window are correctly decoded, the window is advanced by an amount of burst time, at least the portion of the window is updated, and the iterations may be repeated. Correctly decoded bursts may be passed to a next process or device.

22 Claims, 7 Drawing Sheets

(56) References Cited

U.S. PATENT DOCUMENTS

| | | |
|---|---|---|
| 2009/0319838 A1 | 12/2009 | Jones, Jr. |
| 2010/0054131 A1 | 3/2010 | Del Rio Herrero et al. |
| 2010/0074350 A1* | 3/2010 | Malladi ................. H04L 1/0041 |
| | | 375/260 |
| 2011/0125505 A1 | 5/2011 | Vaillancourt et al. |
| 2011/0274216 A1* | 11/2011 | Seshadri ............. H04L 27/2003 |
| | | 375/322 |
| 2016/0081121 A1* | 3/2016 | Lim .................. H04W 74/0833 |
| | | 370/242 |
| 2016/0100413 A1* | 4/2016 | Hwang ................ H04B 7/0452 |
| | | 370/330 |
| 2016/0261297 A1* | 9/2016 | Heinikoski .......... H04B 1/1027 |
| 2016/0330265 A1* | 11/2016 | Abdoli .................. H04L 5/0028 |
| 2016/0373934 A1* | 12/2016 | Lee ....................... H04W 12/10 |
| 2017/0163367 A1* | 6/2017 | Tsai ....................... H04J 11/005 |

OTHER PUBLICATIONS

PCT Application No. PCT/US2016/062959; International Search Report and the Written Opinion of the International Searching Authority, received Apr. 3, 2017.

* cited by examiner

METHODS AND APPARATUSES FOR PROVIDING RANDOM ACCESS COMMUNICATION

FIELD OF THE INVENTION

The invention relates to apparatuses and methods that provide random access to a communication medium for transmissions, without diversity, using low rate forward error correction encoding. In particular, the invention relates to apparatuses and methods for use in a communication system in which information is transmitted asynchronously, without diversity, using low rate forward error correction (FEC) encoding with a code rate no higher than ½.

BACKGROUND

FIG. 1 illustrates an exemplary communication network 100, which includes a number of user terminals 102 competing for access to a gateway terminal 106 via a communication satellite 104. A number of access methods have been developed to permit multiple user terminals 102 to access gateway terminal 106. Fixed Frequency Division Multiple Access (FDMA) is an access method in which each user terminal 102 is assigned a respective fixed frequency and may transmit simultaneously with one or more other user terminals 102, each terminal transmitting on a different frequency. Time Division Multiple Access (TDMA) is an access method in which multiple user terminals 102 are assigned respective time slots at a same frequency and may transmit in rapid succession using their respective time slots, each terminal using a different time slot. However, in FDMA and TDMA, respectively, the user terminals may use the assigned frequency or the assigned time slots intermittently. Therefore FDMA and TDMA access methods are inefficient.

In the early 1970s, a random access method called Aloha was introduced. Aloha allows each user terminal 102 to transmit at will in a same frequency. When multiple user terminals 102 transmit simultaneously, their respective transmissions become corrupted, each multiple user terminal 102 selects a random, and most probably different respective delay, and retransmits after expiration of the respective delay.

Sometime after the introduction of Aloha, a revised access method known as Slotted Aloha, or S-Aloha was introduced. Using S-Aloha, user terminals 102 begin their transmission on a common time marker and have a same transmission duration. S-Aloha reduced, with respect to Aloha, a probability of two user terminals 102 transmitting simultaneously by about 50% due to elimination of partially overlapping transmissions by separate terminals. It is well known that maximum channel utilization for S-Aloha is $e^{-1}$, or about 37%, whereas maximum channel utilization for Aloha is $0.5\ e^{-1}$, or 18.5%. However, both Aloha and S-Aloha become unstable when operating close to capacity because retransmission of previously unsuccessful transmissions tie up the channel. To keep the channel stable, actual channel utilization is kept much lower than the maximum channel utilization stated above.

To improve throughput and minimize delay, it became clear that a user terminal could transmit multiple copies of information in different time slots and have a receiving device sort out duplicate information and request retransmission only when none of the multiple copies of the information are correctly received. Devices in most modern wireless communication systems establish initial communications in this way, which is known as Diversity S-Aloha. In systems using Diversity S-Aloha, typically two or three copies of the information are transmitted.

In the early 2000's, it was observed that, if a receiving device knows locations of duplicated transmissions within received information, and one of the duplicated transmissions is received without corruption, then the receiving device may use the one of the duplicated transmissions to cancel another copy of the duplicated transmission that corrupts a received transmission from a second user terminal, thereby increasing a probability of clear reception. If cancellation is performed iteratively, a probability of receiving uncorrupted transmissions is increased and channel capacity is improved beyond that of Diversity S-Aloha. Such a technique is known as Contention Resolution Diversity Slotted Aloha (CRDSA).

Also in the early 2000's, an access scheme was developed based on low-rate forward error correction (FEC) coding and scrambling codes with iterative interference cancellation performed at a receiving device such that a large number of transmissions, within a time slot, from different terminals can be correctly separated and decoded. The access scheme is known as Scrambled Code Multiple Access (SCMA) and provides much greater capacity than S-Aloha, Diversity S-Aloha, and CRDSA.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

One aspect of the invention is a random access method for communicating in a communication system. Asynchronous communications are communications transmitted without any time slot synchronization. In the communication system, a gateway terminal receives and buffers the asynchronous communications. The asynchronous communications include multiple overlapping bursts, transmitted without diversity, from multiple devices in the communication system. Each of the bursts includes respective data encoded using a low rate forward error correction code having a code rate no higher than ½. The gateway terminal may detect bursts in a sliding window of W burst times, may demodulate and decode the detected bursts, may select incorrectly decoded bursts (as may be determined by a bad cyclic redundancy check (CRC), a bad parity check, or by other methods) in the sliding window of W burst times, and may perform an iteration of an iterative interference cancellation process with respect to the detected bursts. When at least one burst in the sliding window remains incorrectly decoded and a number of repeat iterations of the iterative interference cancellation process is not equal to a maximum number of repeat iterations, another iteration of the iterative interference cancellation process is performed with respect to the bursts of the sliding window that remain incorrectly decoded. When all of the bursts in the sliding window of W burst times are correctly decoded, the sliding window may be stepped by T, where T is an amount of burst times. Correctly decoded bursts may be forwarded to a next process or a next device at any time after being determined as correctly decoded bursts.

Another aspect of the invention is a terminal in a communication system. The terminal includes an analog-to-digital converter, a channel filter and at least one burst processing engine. The analog-to-digital converter converts received analog signals, representing bursts, including multiple overlapping bursts from multiple devices in the communication system, to digital signals. The multiple devices transmitted the analog signals using a random access method, without diversity, and low rate encoding of data at a code rate no higher than ½. The channel filter filters out all but a subset of the communication channel from the digital signals to produce filtered digital signals from the received multiple overlapping bursts. The at least one burst processing engine receives the filtered digital signals from the channel filter, detects bursts of a sliding window of W burst times within the filtered digital signals, demodulates and decodes the detected bursts, determines whether each of the detected bursts is or is not correctly decoded, selects incorrectly decoded bursts in the sliding window (as may be determined by a bad CRC, a bad parity check, or by other methods), and performs an iteration of an iterative interference cancellation process with respect to the incorrectly decoded bursts in the sliding window of W burst times. After completing each iteration, when a number of performed repeat iterations of the iterative interference cancellation process is not equal to a maximum number of iterations and at least one burst in the sliding window of W burst times remains incorrectly decoded, the terminal performs another iteration of the iterative interference cancellation process with respect to the incorrectly decoded bursts of the sliding window of W burst times. When all of the bursts in the sliding window of W burst times are correctly decoded, the sliding window may be stepped by T, where T is an amount of burst times. Correctly decoded bursts may be forwarded to a next process or a next device at any time after being determined as correctly decoded bursts.

A third aspect of the invention is a device in a satellite communication system. The device includes an encoder to forward error correction encode, at a code rate no higher than ½, information to be transmitted to produce encoded information, a modulator to modulate the encoded information, including an added unique word (UW), to produce modulated encoded information, and a transmitter to asynchronously transmit the modulated encoded information without diversity, as a burst, to a second device within the satellite communication system.

DRAWINGS

In order to describe the manner in which the above-recited and other advantages and features can be obtained, a more particular description is provided below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
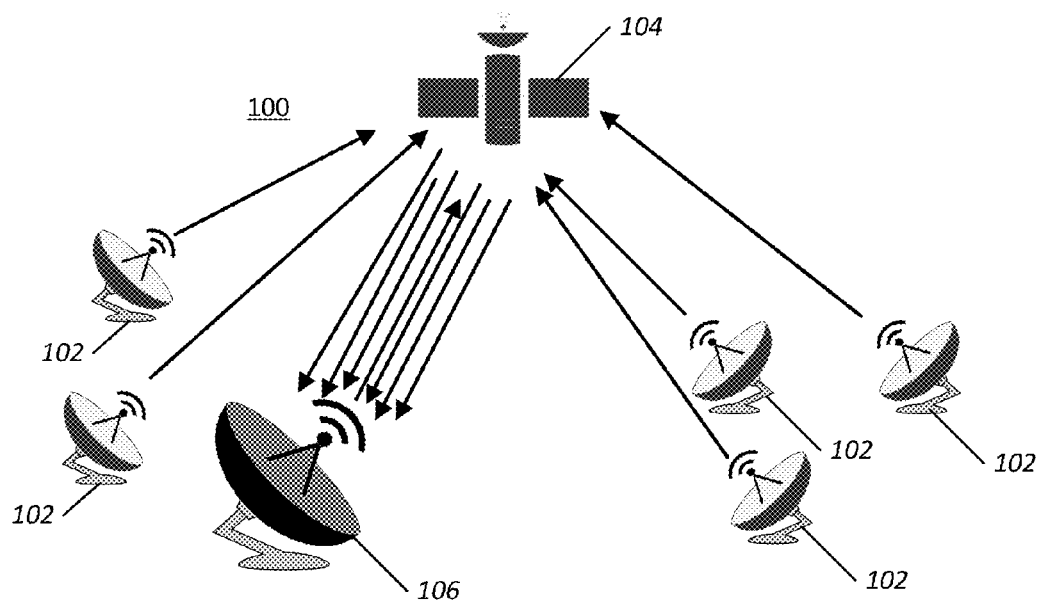
FIG. 1 illustrates an exemplary environment in which embodiments may operate.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

In communication systems, including but not limited to satellite communication systems, retransmissions can greatly increase communication delays. Various embodiments described herein provide a random access method with improvements beyond those of SCMA. Unlike SCMA, S-Aloha, Diversity S-Aloha, and CRDSA, the improved random access method, which we call Asynchronous Scrambled Coded Multiple Access (A-SCMA), assumes that transmissions from terminals are not synchronized on a time-slot basis. As previously described, time slot synchronization reduces a probability of collisions of transmissions among multiple terminals, and improves capacity for S-Aloha and Diversity S-Aloha, but adds to complexity of the terminal. Without time slot synchronization, one-way autonomous applications, including, but not limited to remote sensing, can be enabled.

In various embodiments, a gateway terminal may receive and buffer asynchronous communications transmitted, without diversity, by multiple devices, which encode information to be transmitted using low rate forward error correction coding at a code rate that is no higher than ½. In some embodiments, each of the multiple devices may modulate a respective entire code block, including a UW, by using Binary Phase Shifted Keying (BPSK), Quadrature Phase Shifted Keying (QPSK), or Offset QPSK and may transmit the modulated code block as a burst. The gateway terminal may receive the respective bursts, which may include multiple overlapping bursts that cause interference with other overlapping bursts. Individual received bursts may be detected based on detecting any one Unique Word (UW) from among a group of possible UWs. The gateway terminal may demodulate bursts within a sliding window of W burst times, where W is a window size, to produce demodulated bursts. The gateway terminal may then decode the bursts of the sliding window to produce decoded demodulated bursts and may determine whether the decoded demodulated bursts in the sliding window of W burst times are correctly decoded.

The gateway terminal may then perform interference cancellation using the decoded demodulated bursts.

When the gateway terminal determines that at least one of the decoded demodulated bursts in the sliding window of W burst times is not correctly decoded, then the gateway terminal may perform demodulation, decoding, and interference cancellation iteratively. When the gateway terminal determines that the iteratively performed interference cancellation resulted in all of the decoded demodulated bursts of the sliding window of W burst times being correctly decoded, the sliding window of W bursts may be advanced by an amount of burst time T (i.e., advancing the sliding window by some positive integer, S, of symbols). Copies of the correctly decoded demodulated bursts are provided for further processing to a next process or a next device via a computer interface.

When the gateway terminal determines that the iteratively performed interference cancellation did not result in all of the bursts of the sliding window of W burst times being correctly decoded, and a maximum number of repeats of the iteratively performed interference cancellation was performed, then the sliding window of W burst times is advanced by the amount of burst time T. In a variation of the embodiment, each of the UWs corresponds to a respective scrambling code and each demodulated burst is descrambled based on the corresponding respective scrambling code before decoding each of the demodulated bursts.

Description of Embodiments

Figure 2:
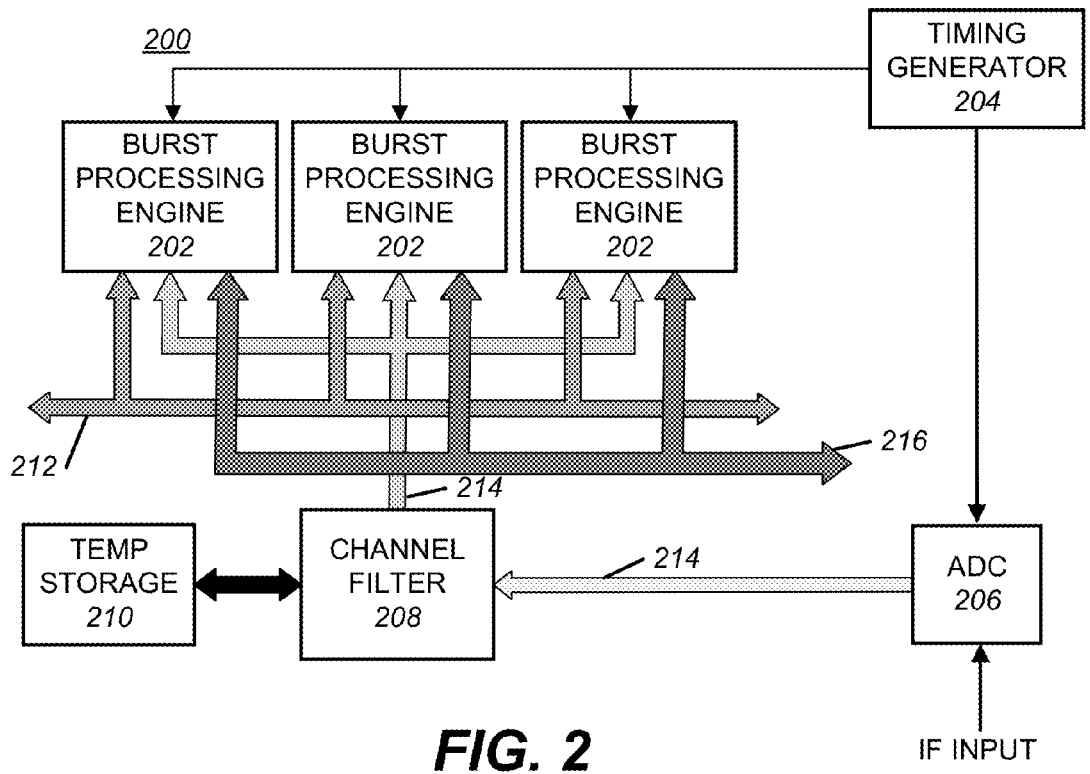
FIG. 2 shows a portion of an exemplary terminal that receives and processes bursts according to one embodiment.

FIG. 2 illustrates a portion of an exemplary gateway terminal 200 that receives and processes bursts according to one embodiment. Gateway terminal 200 may include a number of burst processing engines 202, a timing generator 204, an analog-to-digital converter (ADC) 206, a channel filter 208, temporary storage 210, a programming bus 212, a received sample bus 214, and a computer interface bus 216. In FIG. 2, each burst processing engine 202 includes a respective Field Programmable Gate Array (FPGA) for processing received bursts. In other embodiments, each burst processing engine 202 may include, but not be limited to, a respective Application Specific Integrated Circuit (ASIC). Timing generator 204 may provide sliding window timing signals to burst processing engines 202 and ADC 206. Received analog signals may be down converted from Radio Frequency (RF) (e.g., L-band, Ka-band, etc.) to Intermediate Frequency (IF) and presented to ADC 206, which converts the received analog signals to digital signals and provides the digital signals to channel filter 208 via received sample bus 214.

Channel filter 208 may include a FPGA or an ASIC for filtering out all but a subset of channels of the digital signals. Channel filter 208 separates distinct input frequencies and may store filtered samples in temporary storage 210 until one of burst processing engines 202 is ready to process the stored filtered samples. Temporary storage 210 includes a non-transitory storage medium suitable for storing the filtered samples. Channel filter 208 may provide the filtered samples of the digital signals to respective burst processing engines 202 via received sample bus 214. Burst processing engines 202 may forward correctly decoded data, via computer interface bus 216, to one or more processing devices for processing the correctly decoded data. Programming bus 212 may load programming information into FPGAs of burst processing engines 102.

Although FIG. 2 shows an embodiment including three burst processing engines 202, other embodiments may have fewer or more burst processing engines 202.

Figure 3:
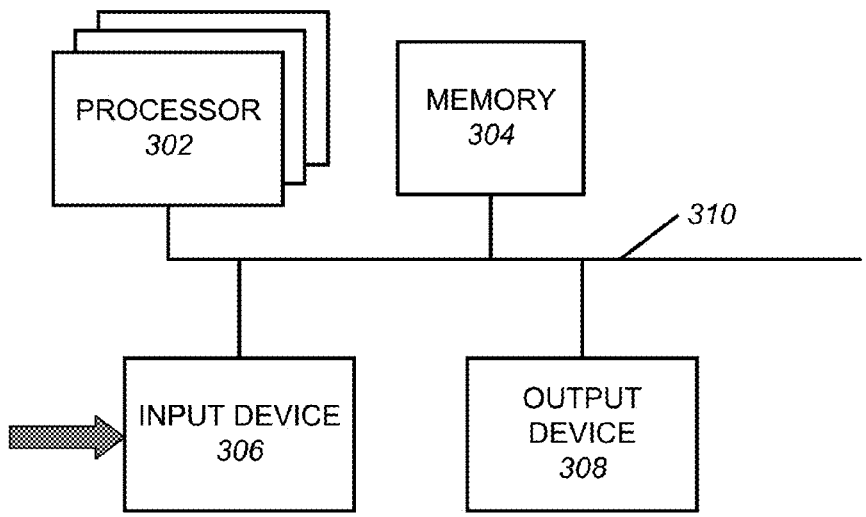
FIG. 3 is a functional block diagram of an exemplary processing device that may process received data from bursts.

FIG. 3 is a functional block diagram of an exemplary processing device 300 for processing received data. Processing device 300 may include one or more processors 302 connected to a bus 310. Memory 304 may store instructions for one or more processors 302 as well as data. Input device 306 may receive the data provided via computer interface bus 216 and may store the received data in memory 304 until one or more processors 302 is ready to process the received data. One or more processors 302 may process the received data and may provide the received data to an output device 308, which may output the received data.

Figure 4:
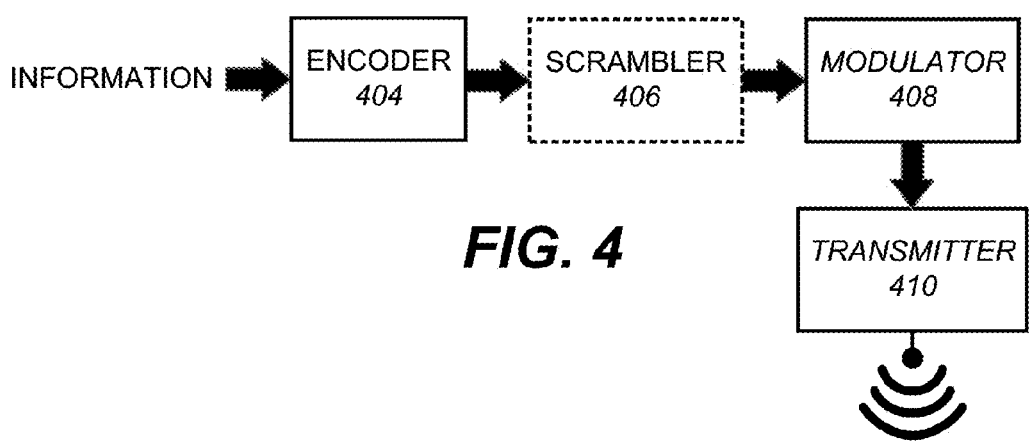
FIG. 4 is a functional block diagram of an exemplary device that asynchronously transmits data in some embodiments.

FIG. 4 is a functional block diagram of an exemplary device 400 for transmitting data according to various embodiments. Exemplary device 400 may be included in a terminal or may be included in a separate device that transmits data, but does not receive data. Exemplary device 400 may include an encoder 404, a scrambler 406, a modulator 408, and a transmitter 410. In some embodiments, device 400 may be a sensor, which may include a measuring component (not shown) to measure an aspect of a surrounding environment. The sensor may transmit information to other devices in a network such as measurement data, but may not receive information from other devices in the network. In some embodiments, encoder 404 and scrambler 406 may be implemented by a FPGA or an ASIC.

Encoder 404 may encode information to be transmitted using a low rate FEC code having a code rate that is no higher than ½. Scrambler 406 may receive the encoded data from encoder 404 and may exclusive- or a scrambling code, which is a random sequence, with the encoded data. In some embodiments, each transmitting device is assigned a respective Unique Word (UW) from a group of UWs. Each respective UW may be associated with a corresponding scrambling code. In such embodiments, scrambler 406 may scramble the encoded data using a scrambling code that corresponds to the respective UW. Modulator 408 may receive and modulate the scrambled encoded data, and may provide the scrambled encoded data to a transmitter 410, which may include the respective assigned UW with the scrambled encoded data when transmitting. In some embodiments, a signal may be modulated onto QPSK symbols. Although other alphabets are possible in other embodiments.

In some embodiments, exemplary device 400 may not include scrambler 406. In such embodiments, modulator 408 may receive and modulate the encoded data and may provide the encoded data to transmitter 410.

Figure 5:
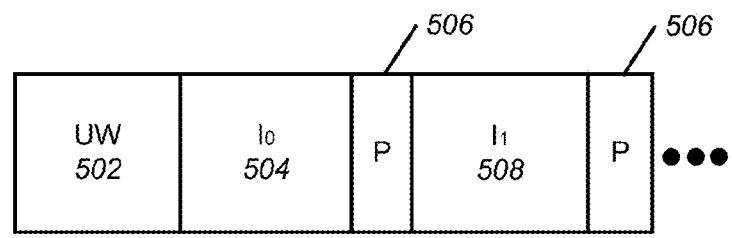
FIG. 5 illustrates an exemplary format of a burst in some embodiments.

FIG. 5 illustrates an exemplary burst format, which may be used in various embodiments. UW 502 may be at a beginning of a burst followed by segments of coded information pilot symbols 506 inserted periodically, or otherwise, to provide channel estimation at a receiver. $I_0$ 504 and $I_1$ 508 may be portions of scrambled encoded information (in embodiments in which device 400 includes scrambler 406) or $I_0$ 504 and $I_1$ 508 may be portions of encoded information (in embodiments in which device 400 does not include scrambler 400). Although FIG. 5 shows UW 502 at the beginning of the burst, in other embodiments, UW 502 may appear in a middle or an end of the burst.

Figure 6:
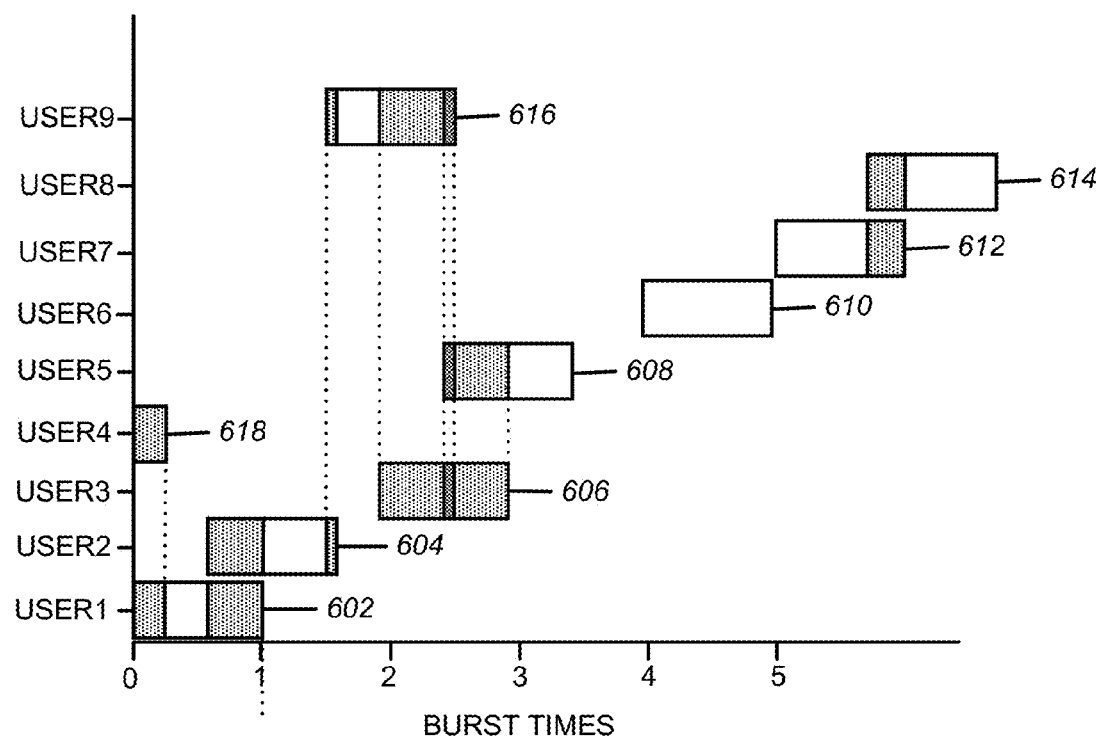
FIG. 6 shows exemplary bursts, including overlapping bursts, that may be received from multiple transmitting devices.

FIG. 6 illustrates exemplary overlapping asynchronous bursts, which may be received at any time from multiple transmitting devices in various embodiments. The overlapping bursts are not aligned on time slots. Each of the overlapping bursts include data, transmitted without diversity, encoded using a low rate FEC code having a code rate that is no higher than ½. In this example, the code rate may be ⅑. In embodiments in which device 400 includes scrambler 406, each of the overlapping bursts may include encoded data that has been scrambled according to a scrambling code, or sequence, corresponding to a respective UW assigned to respective transmitting devices. Burst 602 overlaps and interferes with bursts 618 and 604, which also interfere with burst 602. A portion of burst 604 and burst 616 interfere with each other. Portions of bursts 606, 608 and 616 interfere with each other. Burst 610 is transmitted without interference from other bursts. Portions of bursts 612 and 614 interfere with each other.

Figure 7:
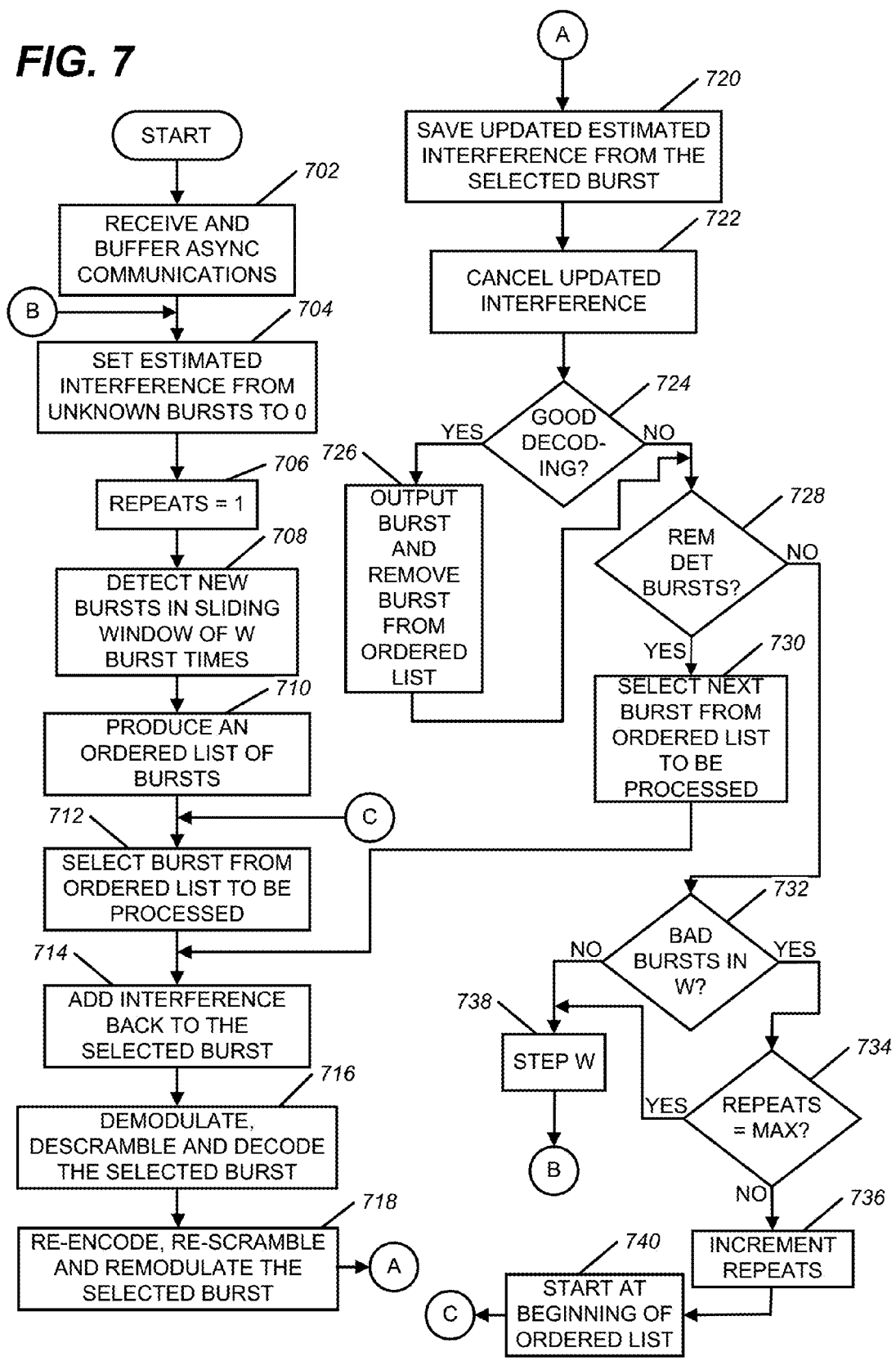
FIGS. 7-12 are flowcharts that explain exemplary processing performed in various embodiments.

FIG. 7 is a flowchart that explains exemplary processing performed in various embodiments. The process may begin with asynchronous bursts being received by a gateway terminal at any time from multiple user terminals or other transmitting devices. The bursts may be buffered and provided to one or more burst processing engines 202, which may store the received bursts for processing in an input buffer (act 702). The use of the input buffer will be described subsequently. Act 702 continues to be performed while processing described in the remaining acts of FIG. 7 are performed. The asynchronous bursts were transmitted without diversity and were encoded using a low rate FEC code with a code rate no higher than ½. In some embodiments, the low rate FEC code has a code rate of ⅕, although other code rates that are no higher than ½ may be used in other embodiments.

Burst Processing engine 202 may set an estimated interference from unknown bursts to zero (act 704), may set a repeat count to 1 (act 706) and may detect new bursts in a sliding window of W burst times (act 708). We recommend that the window size, W, be greater than three burst times. Selecting a suitable window size, W, is a performance complexity trade-off. In some embodiments, the window size, W, may be 5 burst times. In other embodiments, the window size may be 3 burst times or another suitable number of burst times.

Burst processing engine 202 may detect bursts using correlation with each possible UW sequence. UWs may be detected by searching for correlation peaks. UW sequences may be obtained from a single sequence and may be related by a Walsh code construction. In some embodiments, if M denotes a number of different UWs and N denotes a length of each UW, rather than M correlators of length N, M correlators of length N/M may be employed, followed by a Fast Hadamard Transform (FHT). In one embodiment, there may be 64 different possible UWs, each of which may have a length of 512 symbols constructed from Walsh codes. Each transmitting device may be assigned a respective one of the UWs, which the transmitting device typically inserts at a beginning of a burst, but may insert in a middle of the burst or at an end of the burst in other embodiments.

Symbol times may be estimated, in one embodiment, by using a correlation output at 2 samples/symbol with inverse parabolic interpolation to approximate a sub-sample timing offset. Known pilot symbols may be used to produce a frequency estimate.

Burst processing engine 202 may then produce an ordered list of the bursts which have been detected, ordering may be according to the bursts' signal-to-noise-plus-interference ratio (SINR), or according to any other ordering (act 710).

Over the ordered list of bursts to be processed, a number of iterations may be performed wherein in each iteration, for each burst in the ordered list, a burst is selected for processing (act 712). Samples from the input buffer relevant to this burst are retrieved, and any previously determined interference by this selected burst (which may have been subtracted on a previous iteration) may be added to the selected burst (act 714). The selected burst may then be demodulated, descrambled (if transmitters perform scrambling) and decoded (act 716) and then re-encoded, re-scrambled (if descrambling was performed) and re-modulated to obtain an updated estimate of the interference caused by the selected burst (act 718). Remodulated output is used for interference cancellation and may be an estimate of the original transmitted burst, including the effects of timing, phase, amplitude, and frequency. The estimate may be considered an expected value of the burst or an expected amount of interference, with respect to other bursts, caused by the burst. The expected amount of interference caused by the burst may be saved (act 720). In some embodiments, the expected amount of the interference caused by the burst may be saved in a buffer. This interference estimate is then cancelled from the input buffer (act 722). The estimated interference caused by the selected burst may be canceled by subtracting, from the input buffer, the estimate of the interference caused by this burst. In other embodiments, other methods may be used to cancel the estimated interference caused by the selected burst. If an estimated value of any burst was not previously determined, then a previously determined estimated value of the burst is set to zero. In this way, data in the input buffer always contains the original input data with the most current estimates of all known bursts removed.

Burst processing engine 202 may then determine whether the decoding of the selected burst, performed in act 716, was performed correctly (i.e., a burst that passes parity and cyclic redundancy code (CRC) checks, or other checks) (act 724). If the decoding was performed correctly, then the selected burst may be sent, or forwarded, to the next device or the next process and may be removed from the ordered list of bursts (act 726). Processing may then continue with act 728. If the decoding was not performed correctly, then burst processing engine 202 may determine whether any detected bursts remain to be processed (act 728). If detected bursts remain to be processed, burst processing engine 202 may select a next burst from the ordered list for processing (act 730) and control may proceed to act 714. If, during act 728, no detected bursts remain to be processed, then burst processing engine 202 may determine whether any bad, or incorrectly decoded bursts, remain in the window (act 732). If incorrectly decoded bursts are determined to remain in the window, then burst processing engine 202 may determine whether a maximum number of iterations were performed (act 734). If the maximum number of iterations were not performed, then burst processing engine 202 may increment a number of repeats, or iterations (act 736), burst processing engine 202 may prepare to begin processing of bursts at a beginning of the ordered list of bursts (act 740) and control may return to act 712 to select a burst from the ordered list for processing. If, during act 732, no incorrectly decoded bursts remain in the window, then the window may be stepped (act 738) and control may return to act 704 to set estimated interference caused by unknown bursts to zero. The sliding window of W burst times may be stepped, or advanced, by some amount of burst times (i.e., advancing the sliding window by some positive number, S, of symbols).

In the above description of iteration, including the steps of selecting a burst to be processed (which includes demodulating, descrambling, decoding, re-encoding, re-scrambling, re-modulating), and interference cancellation, it is understood that the ordering of the processing steps may be varied. A particular order of selecting bursts to be processed, and interference of other bursts cancelled may be varied according to any possible schedule, reflecting tradeoffs of implementation complexity and receiver performance.

Figure 8:
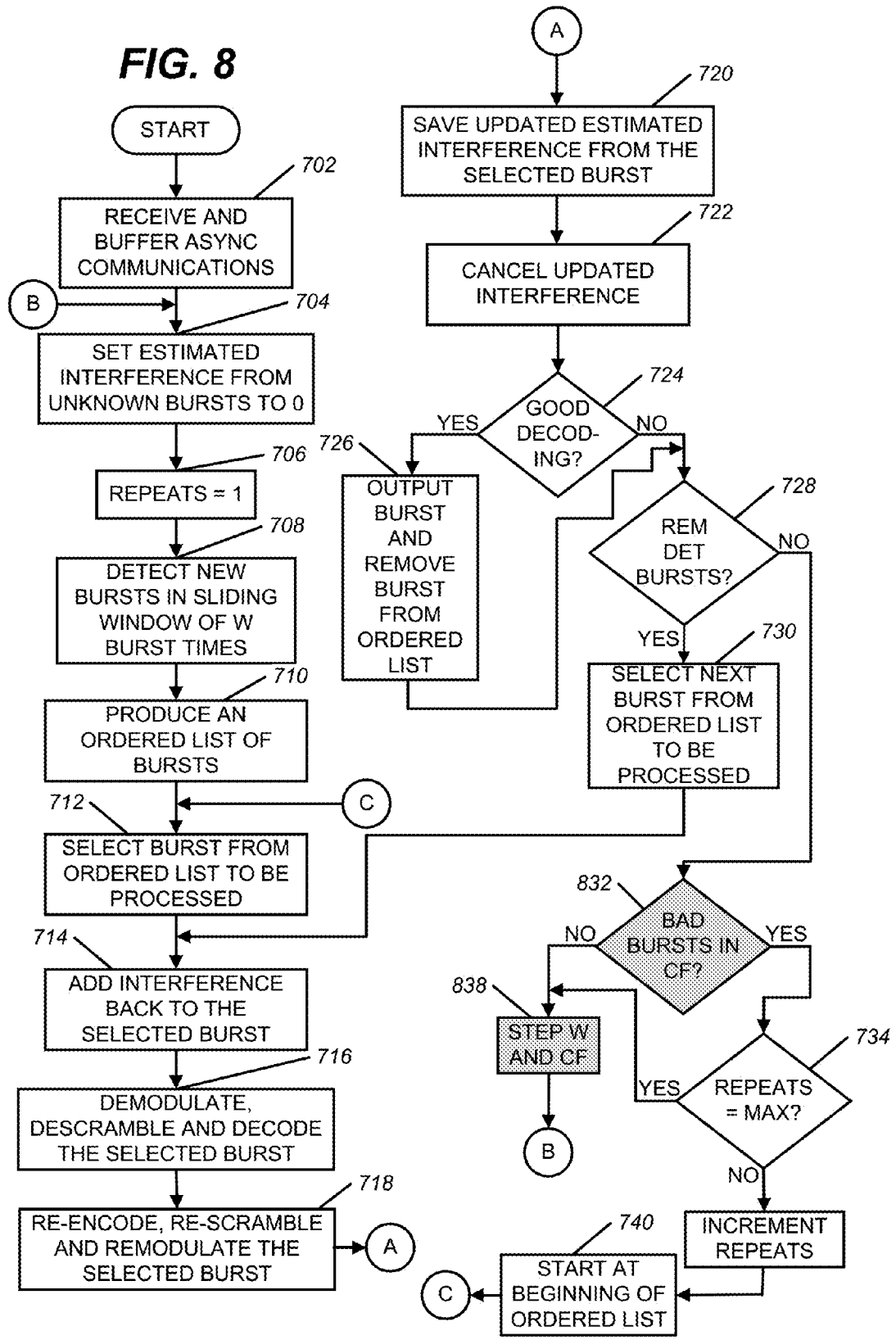

A variation of the process shown in FIG. 7 may be employed in some embodiments. FIG. 8 illustrates the variation. Acts 832 and 838, which are shaded, illustrate differences from the process of FIG. 7. Since the process of FIG. 7 was discussed previously, only the changed acts and some acts executing before and after the changed acts are discussed. In the variation of FIG. 8, a considered fraction (CF) of the sliding window W of burst times may include a fraction of an oldest burst time or one or more oldest burst times of the sliding window. In some embodiments, the CF may have a size of about 20% of the sliding window of W burst times. Thus, if W is 5 burst times, then CF may have a size of one burst time and may include an oldest burst time of the sliding window of W burst times. In other embodiments, CF may have a size of three burst times.

In this variation, the difference from the process described by FIG. 7 is that instead of terminating the iteration and advancing the window W by some time T when no bursts remain in the ordered list (all detected bursts in the window W are correct), the iteration is terminated and the window W is advanced by some time T (i.e., the sliding window is advanced by some positive number, S, of symbols) when no bursts remain in the ordered list whose time of arrival is within the CF from the start of the window W, where CF is some fraction of the window W, or when the maximum number of iterations is reached.

Timestamps

In a variation, data packets may arrive at user terminal 102 as variable length packets. User terminal 102 may transmit each of the variable length packets as fixed-sized bursts to gateway terminal 106 on a physical channel. At gateway terminal 106, the received fixed-sized bursts may be reassembled into a packet. A straightforward method for accomplishing this involves labeling each burst with three values: a packet ID, a sequence number and a packet length. Unfortunately, this method introduces much overhead.

Figure 9:
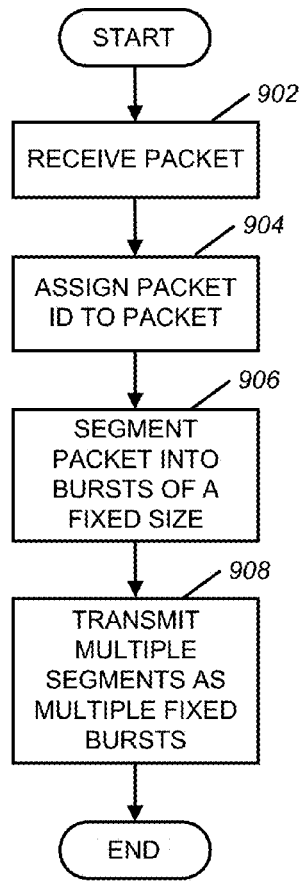
Figure 10:
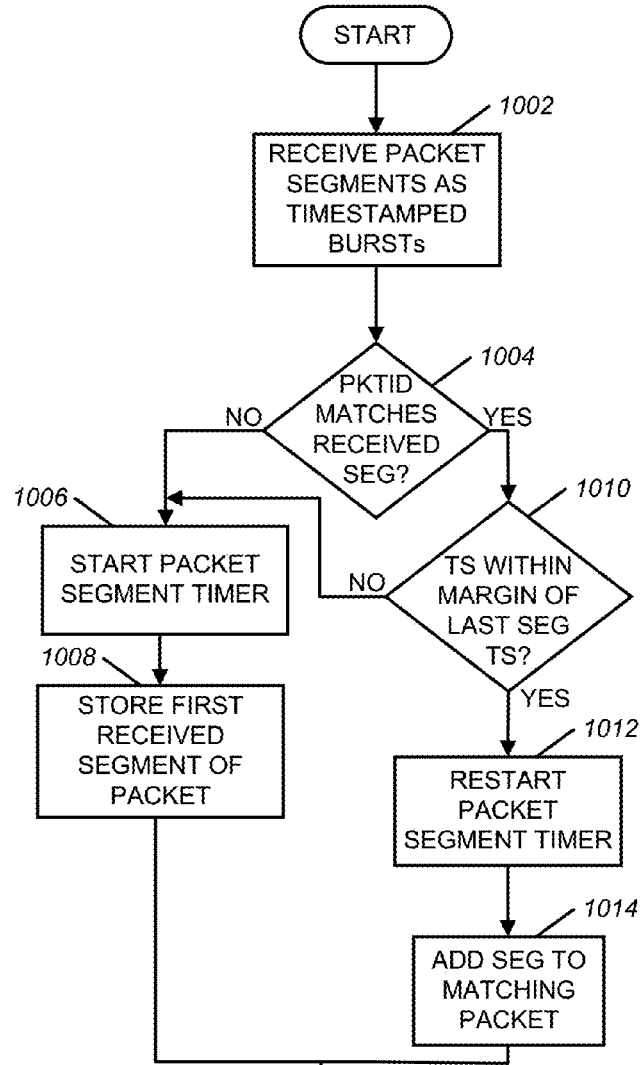
Figure 11:
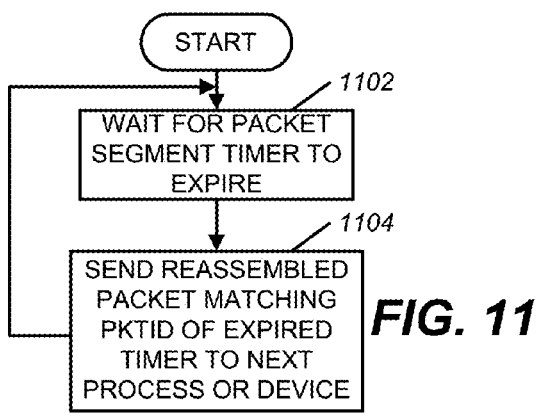

A more efficient method is illustrated by FIGS. 9-11. FIG. 9 illustrates an exemplary process performed by user terminal 102. User terminal 102 may receive a packet (act 902) and may assign a packet ID to the packet (act 904). User terminal 102 may segment the packet into bursts of a fixed size, each of which includes the packet ID (act 906). User terminal 102 may then transmit the multiple fixed-sized bursts to gateway terminal 106 (act 908).

FIG. 10-11 illustrate an exemplary method that may be performed by gateway terminal 106 in this variation. In this variation, bursts are timestamped with a time at which each burst is detected by gateway terminal 106. Also acts 717 and 724 of FIGS. 7 and 8 are modified to provide the received bursts, which were correctly decoded, to the exemplary process illustrated by FIG. 10.

As illustrated by FIG. 10, packet segments may be received by gateway terminal 106 as timestamped fixed-sized bursts (act 1002). Gateway terminal 106 may then determine whether a packet ID in a received burst matches a previously received packet segment (act 1004). If the packet ID in the received burst is determined to not match the previously received packet segment, then a packet segment timer, associated with the packet ID, may be started (act 1006) and a first received segment of the packet may be stored (act 1008).

If, during act 1004, the packet ID is determined to match a packet ID of a previously received packet segment, then the timestamp associated with the packet segment may be compared with the timestamp associated with the previously received packet segment to determine whether the current packet segment was received within a predefined margin of the previously received packet segment (act 1010). This assumes that inter-arrival times between bursts of a packet are known and fixed. In a variation of this embodiment, instead of timestamping each burst with a time at which the burst is detected, each burst may be time stamped with a time at which the burst is detected modulo an expected inter-arrival time. Act 1010 may then be performed by determining whether a current timestamp is within + or − the predefined margin.

If the timestamp is within the predefined margin of the timestamp of the last segment received for the packet, then the packet segment timer associated with the packet ID is restarted (act 1012) and the current packet segment is added to the stored packet segment(s) associated with the packet ID (act 1014).

If, during act 1010, the timestamp of the current packet segment is determined not to be within the predefined margin of the timestamp of the last received packet segment associated with the packet ID, then the packet segment(s) associated with the packet ID of the current burst may be treated as a first received packet segment associated with the packet ID and acts 1006 and 1008 may be performed to start the packet segment timer and store the first received packet segment associated with the packet ID, respectively.

FIG. 11 illustrates an exemplary process that may be performed in gateway terminal 106 in the just-discussed variation. In the exemplary process, gateway terminal 106 may wait for a packet segment timer to expire (act 1102). When a packet segment timer associated with a packet ID expires, the reassembled packet associated with the packet ID may be sent to a next process or device (act 1104). Acts 1102-1104 may be repeated.

Frequency Hopping

When burst arrivals are independent, A-SCMA works well. However, when packets are segmented, bursts are not independent. If successive bursts of the packet are transmitted continuously in time, performance at a receiving gateway terminal will be degraded.

Often, a communication system will have multiple available channels (frequencies). If such a communication system uses A-SCMA, successive bursts of a packet may be transmitted to a gateway terminal on randomly selected frequencies selected from a pool of known frequencies. Of course, in such a system, the receiving gateway terminal should be capable of receiving bursts sent over any of the known frequencies.

Figure 12:
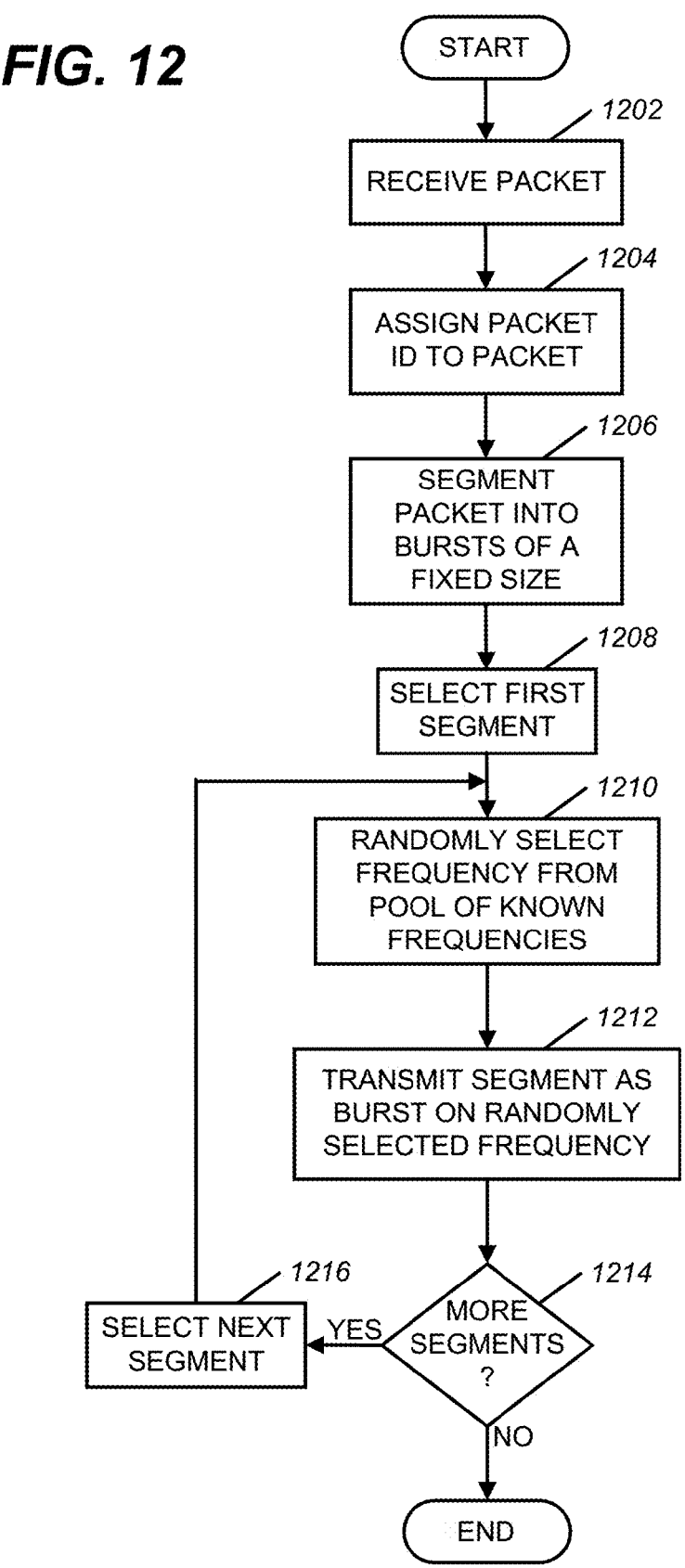

FIG. 12 illustrates an exemplary process performed by a transmitting device, which may include, but not be limited to, a user terminal or a sensor. The process is a variation of the process shown in FIG. 9. The process may begin with the transmitting device receiving a packet (act 1202) and assigning a packet ID to the packet (act 1204). The packet may be segmented into multiple bursts of a fixed size, each of which may include the assigned packet ID (act 1206). The transmitting device may then select a first segment of the packet (act 1208) and may randomly select a frequency from a pool of known frequencies, which a receiving device such as, for example, a gateway terminal, is capable of receiving (act 1210). The transmitting device may then transmit, to the receiving device, the segment as a fixed-sized burst on the randomly selected frequency (act 1212). The transmitting device may then determine whether there are additional segments of the packet to transmit (act 1214). If there are additional segments of the packet to transmit, the transmitting device may select a next segment of the packet (act 1216) and may repeat acts 1210-1214.

If, during act 1214, the transmitting device determines that no additional segments of the packet remain to be transmitted, then the process ends.

In this variation, the processes described by FIGS. 10 and 11 would remain unchanged. However, the packets received by the receiving device as fixed-size bursts may be received on any of the known frequencies from the pool of known frequencies.

Advantages of the Invention

Embodiments of the present invention have a number of advantages over existing access methods. For example, A-SCMA was found to double utilization capacity with respect to SCMA. This is due to terminals being free to choose when to start transmissions, resulting in less mutual interference, thereby improving interference cancellation performance applied by a receiving device. Further, because time slot synchronization is not used in A-SCMA, terminals may have less complexity making possible one-way autonomous applications such as, for example, remote sensing. Other advantages include:

1. much higher capacity than any existing random multiple access schemes;
2. negligible latency caused by retransmission due to a very high probability of a successful first transmission attempt; and
3. very simple implementation of transmit only terminals that transmit at will.

Conclusion

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. For example, although examples of a satellite communication system were provided above as implementing various embodiments, the various embodiments may be implemented in other types of communication systems having delays of an order of magnitude less than delays found in a typical satellite communication system.

Further, implementations consistent with the subject matter of this disclosure may have more or fewer acts than as described, or may implement acts in a different order than as shown. Accordingly, the appended claims and their legal equivalents should only define the invention, rather than any specific examples given.

We claim as our invention:

1. A random access method for communicating in a communication system, the random access method comprising:
    receiving and buffering, by a terminal, asynchronous communications including a plurality of overlapping asynchronous bursts transmitted without diversity by at least one other device in the communication system, each of the plurality of overlapping bursts including low rate forward error correction encoded data and causing interference to at least one other of the plurality of overlapping bursts, the low rate forward error correction encoded data having been encoded at a code rate that is no higher than $\frac{1}{2}$;
    detecting, by the terminal, a plurality of bursts in a sliding window of W burst times;
    processing, by the terminal, each burst of the plurality of bursts by demodulating, decoding, and producing an estimate of an interference created by each burst; and
    cancelling, by the terminal, the estimate of the interference of the processed burst from received signals of all other detected bursts of the plurality of bursts.

2. The random access method of claim 1, further comprising:
    performing another iteration of the demodulating, the decoding, the producing an estimate of the interference created by each burst and the cancelling the estimate of the interference if at least one burst is not correctly decoded in a considered fraction of a sliding window of W burst times.

3. The random method of claim 1, further comprising:
    advancing the window of W burst times by S symbols, where S is a positive integer, if all the bursts in a considered fraction of the sliding window are determined to be correctly decoded, or if a maximum number of iterations are performed.

4. The random access method of claim 1, wherein the processing each burst further comprises:
    ordering the bursts based on respective signal-to-noise-plus-interference ratios.

5. The random access method of claim 1, wherein the detecting a plurality of bursts in a sliding window of W burst times further comprises:
    detecting any respective one of a plurality of unique words in each burst of the plurality of bursts in the sliding window.

6. The random access method of claim 5, further comprising:
    descrambling each of the detected plurality of bursts after performing the demodulating and before performing the decoding, wherein:
    each of the plurality of unique words corresponds to a respective scrambling code.

7. The random access method of claim 1, wherein:
    the communication system is a satellite communication system, and the terminal is a gateway terminal.

8. The random access method of claim 1, wherein:
    the detecting a plurality of bursts in a sliding window of W burst times further comprises:
        associating a time stamp with each of the detected plurality of bursts; and
    the random access method further comprises:
        determining whether a packet ID of a packet segment included in a burst of the detected plurality of bursts matches a packet ID of a previously received packet segment;
        when the packet ID of the packet segment included in the burst matches the packet ID of the packet segment included in the previously received packet segment, performing:
            determining whether a timestamp associated with the burst is within a predefined margin of a timestamp associated with the previously received packet segment;
            when the timestamp associated with the burst is within the predefined margin of the timestamp associated with the previously received packet segment, performing:
                restarting a packet segment timer associated with the packet ID, and
                adding the packet segment to a partially re-assembled packet including the previously received packet segment.

9. The random access method of claim 8, further comprising:
when the packet ID of the packet segment included in the burst does not match the packet ID of the packet segment included in the previously received packet segment, performing:
starting the packet segment timer associated with the packet ID, and
storing the packet segment included in the burst as a new partially re-assembled packet.

10. The random access method of claim 9, further comprising:
detecting an expiration of the packet segment timer; and
forwarding the partially re-assembled packet as the re-assembled packet upon detecting the expiration of the packet segment timer.

11. The random access method of claim 9, further comprising
receiving, from a single source, successive bursts including respective packet segments of a packet, the successive bursts being received on different frequencies of a pool of frequencies.

12. A terminal in a communication system, the terminal comprising:
an analog-to-digital converter to convert received analog signals to digital signals, the analog signals representing a plurality of bursts, including multiple overlapping bursts from multiple devices in the communication system, the multiple devices having asynchronously transmitted the analog signals using a random access method without diversity and low rate encoding having a code rate that is no higher than ½;
a filter configured to filter out all but a subset of a communication channel from the digital signals, wherein the filter produces at least one filtered digital signal of the plurality of bursts; and
at least one burst processing engine configured to receive the filtered digital signals of the plurality of bursts from the channel filter, wherein the at least one burst processing engine performs a method comprising:
detecting, within the filtered digital signals, a plurality of bursts in a sliding window of W burst times,
processing each burst of the plurality of bursts by demodulating, decoding, and producing an estimate of interference created by each burst; and
cancelling the estimate of the interference from received signals of all other detected bursts of the plurality of bursts.

13. The terminal of claim 12, wherein the method further comprises:
performing another iteration of the demodulating, the decoding, the producing an estimate of the interference created by each burst and the cancelling the estimate of the interference if at least one burst is not correctly decoded in a considered fraction of a sliding window of W burst times.

14. The terminal of claim 12, further comprising:
advancing the window of W burst times by S symbols, where S is a positive integer, if all bursts in a considered fraction of the sliding window are determined to be correctly decoded, or if a maximum number of iterations are performed.

15. The terminal of claim 12, wherein the processing each burst of the plurality of bursts further comprises:
ordering the bursts based on respective signal-to-noise-plus-interference ratios.

16. The terminal of claim 12, wherein the detecting a plurality of bursts in a sliding window of W burst times further comprises:
detecting any respective one of a plurality of unique words in each burst of the plurality of bursts in the sliding window.

17. The terminal of claim 16, wherein the method further comprises:
descrambling each of the detected plurality of bursts after performing the demodulating and before performing the decoding, wherein:
each of the plurality of unique words corresponds to a respective scrambling code.

18. The terminal of claim 12, wherein:
the communication system is a satellite communication system, and
the terminal is a gateway terminal.

19. The terminal of claim 12, wherein:
the detecting a plurality of bursts in a sliding window of W burst times further comprises:
associating a respective timestamp with each of the detected plurality of bursts; and
the method further comprises:
determining whether a packet ID of a packet segment included in a burst of the detected plurality of bursts matches a packet ID included in a previously received packet segment;
when the packet ID of the packet segment included in the burst matches the packet ID of the packet segment included in the previously received packet segment, performing:
determining whether a timestamp associated with the burst is within a predefined margin of a timestamp associated with the previously received packet segment; and
when the timestamp associated with in the burst is within the predefined margin of the timestamp associated with the previously received packet segment, performing:
restarting a packet segment timer associated with the packet ID, and
adding the packet segment to a partially re-assembled packet including the previously received packet segment.

20. The terminal of claim 19, wherein:
when the packet ID of the packet segment included in the burst does not match the packet ID of the packet segment included in the previously received packet segment, performing:
starting the packet segment timer associated with the packet ID, and
storing the packet segment included in the burst as a new partially re-assembled packet.

21. The terminal of claim 20, wherein the method further comprises:
detecting an expiration of the packet segment timer; and
forwarding the partially re-assembled packet as the re-assembled packet upon detecting the expiration of the packet segment timer.

22. The terminal of claim 20, further comprising
receiving, from a single source, successive bursts including respective packet segments of a packet, the successive bursts being received on different frequencies of a pool of frequencies.

* * * * *